Feb. 5, 1957 R. STÖCKER 2,779,970
EXTRUSION MOLDING APPARATUS
Filed Oct. 11, 1954

United States Patent Office 2,779,970
Patented Feb. 5, 1957

2,779,970

EXTRUSION MOLDING APPARATUS

Rudolf Stöcker, Coburg, Germany, assignor to Siemens-Schuckertwerke Aktiengesellschaft, Berlin-Siemensstadt and Erlangen, Germany, a German corporation Application October 11, 1954, Serial No. 461,593

Claims priority, application Germany October 13, 1953

8 Claims. (Cl. 18—13)

My invention relates to extrusion apparatus for molding thermoplastic material into tube, rope or other strand-shaped structures of a plurality of helically arranged colors and, in a more particular aspect, to extrusion-molding apparatus for surrounding electrical wires, cords or cables with an insulation helically subdivided into two or more colors.

It is known to provide such extrusion apparatus with a rotating extrusion nozzle. These apparatus have a rotatable cylindrical mandrel with an attached nipple that surrounds the conductor and determines the thickness of the extruded insulation, the plastic materials being supplied through annular channels. Considerable difficulties have been encountered in properly sealing the junction between the stationary and rotatable parts, and to secure a satisfactory division between the differently colored, helical strand portions of the extruded material so that the colors do not run together.

It is an object of my invention to obviate these difficulties.

To this end, and in accordance with a feature of the invention, the rotatable extrusion nozzle in plural-color extrusion apparatus of the above-mentioned type is mounted in displaceable relation to the nozzle drive so that the nozzle has clearance in the axial and radial directions relative to its drive; and this nozzle has a concentric sealing face of conical shape and is subjected to axially directed spring force so that the conical face rests against a mating conical sealing face of a stationary extrusion head. The sealing of the rotatable nozzle is thus effected by means of a floating, self-centering cone.

According to another feature of the invention, the nozzle comprises an assembly of a driven sleeve or shell member and an insert in that member. The shell member is provided with conical sealing faces and with arcuate openings for the passage of the plastic material. The insert is of torpedo or double-cone shape and has dividing ribs on its conical portion facing the exit side of the assembly so that the ribs form channels for preserving a helical subdivision of the material being extruded.

According to still another feature of my invention, an increased travel speed of the extrusion-insulated conductor or a reduced driving speed of the rotating nozzle assembly can be achieved by having a single annular material-supply opening in the shell member communicate with a plurality of the channels formed by the ribs of the torpedo-shaped insert so that a plural-helix is extruded from material entering through one and the same opening.

According to a further feature of the invention, a nipple or mouthpiece, determining the cross section of the emerging product, is tightly mounted on the exit side of the torpedo-shaped insert which, as explained, helically separates the mass of material being extruded, the nipple being likewise provided with a conical sealing face engageable with the shell member of the nozzle assembly.

These and other objects and features of the invention will be apparent from the following description in conjunction with the embodiment of the invention exemplified by the accompanying drawings, wherein—

Figure 5:
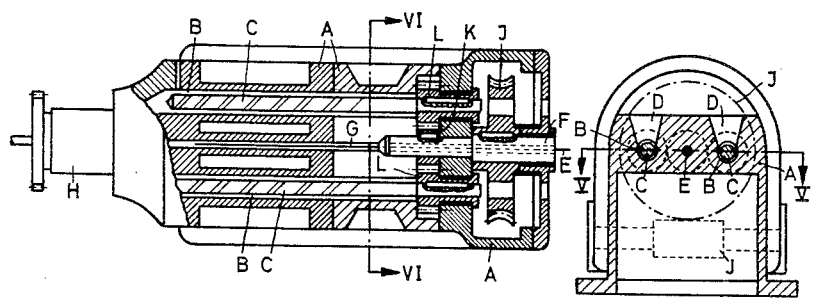
Fig. 5 is a horizontal, part-sectional view of an extrusion press equipped with a nozzle structure according to Figs. 1 to 3, the section being along the line V—V in Fig. 6.
Figure 6:
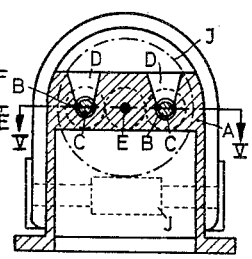
Fig. 6 is a vertical cross section taken along the line VI—VI in Fig. 5.

Referring first to Figs. 5 and 6, the illustrated machine has a composite housing structure A with two feed channels B in which respective feed screws C are located. The channels are supplied with plastic material through respective hoppers D. The materials charged into the two hoppers are of different color. A conductor wire E to be insulated passes axially through a hollow shaft F and an adjacent, coaxial guide tube G and thence through the nozzle portion H of the machine. Shaft F carries a gear I driven from a worm J, and also a gear K meshing with two gears L on the respective shafts of the feed screws C so that, during machine operation, the two feed screws are simultaneously driven at the same speed.

Figure 1:
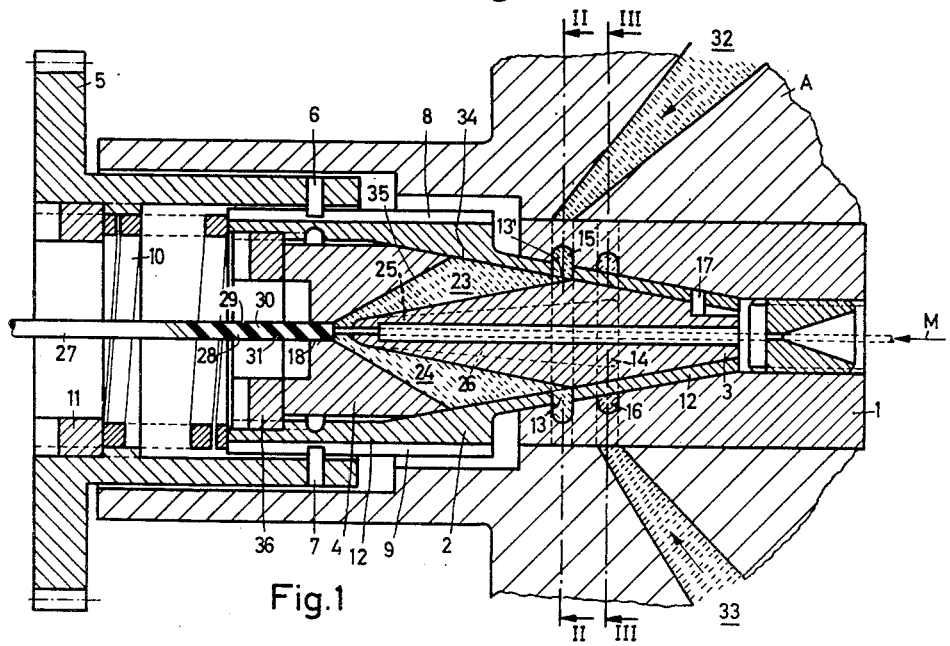
Fig. 1 is a cross-sectional view of an extrusion nozzle structure, the section being along a radial plane.

During the passage of the conductor wire E through the nozzle portion H, an insulating jacket of two helically-arranged colors is extruded onto the conductor, as will now be described with reference to the details of the nozzle structure shown in Figs. 1 to 3.

A stationary extrusion head 1 is firmly joined with the housing structure A of the machine and carries a rotatable nozzle assembly N composed of a shell member 2, a torpedo-shaped insert 3 within the shell member, and a nipple piece 4. During operation, the shell member 2 is continuously driven from the sleeve-shaped hub portion of a drive gear 5 through two entrainer pins 6, 7 entering with clearance into respective longitudinal grooves 8, 9 of the shell member 2.

The shell member 2 is urged axially toward head 1 by means of a compression spring 10. Spring 10 is seated against a holding nut 11 fixed within the driving member 5 so that the shell member with its conical-shaped portion 12 is self-centered and floatingly held in tightly sealing relation to the extrusion head 1. The conical portion 12 of the shell member 2 has arcuate openings 13 and 14 which register with respective annular grooves 15 and 16 in the extrusion head 1. The grooves 15 and 16 communicate with respective supply channels 32 and 33 leading to the outlets of the above-described feed-screw channels B (Figs. 5, 6). Hence, the channels 32 and 33 (Fig. 1) supply the respective amounts of material from which the differently colored, helical portions of the insulating jacket are to be formed.

The torpedo-shaped insert 3 is fixed within the shell member 2 by means of an interconnecting pin 17 and has conical surfaces 34 and 35 at both sides respectively. At its side facing the exit of the assembly, the insert 3 is provided with ribs 19, 20, 21, 22. These ribs form partitions which, together with the nipple piece 4, define four channels 23, 24, 25 and 26 for separation of the plastic material into helical formation.

Figure 2:
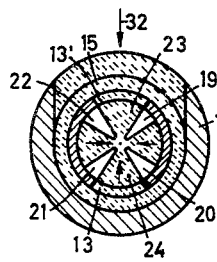
Fig. 2 is a cross-sectional view taken along the line II—II in Fig. 1.
Figure 3:
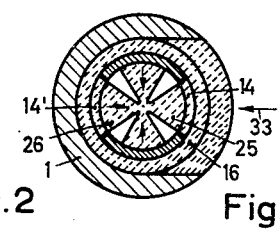
Fig. 3 is a cross-sectional view taken along the line III—III in Fig. 1.

As apparent from Fig. 2, the annular groove 15 in the shell member 2 is so arranged, with respect to the openings 13 and 13' in the shell member 2 and the channels 23 and 25 of the insert 3, that a two-part helix of one color is extruded from material supplied through the channel 32. By referring to Fig. 3, it can be seen that the material-supply channel 33 communicates through the annular groove 16 with the two openings 14 and 14' of the shell member 2 so that a two-part helix of another color is produced through the channels 25 and 26 of the insert 3.

The nipple piece 4 is closely fitted upon the conical surface portion 35 of the torpedo-shaped insert 3 and is secured thereto by a nut 36 screwed into the shell member 2. The dividing ribs 19, 20, 21 and 22 of the insert 3 extend all the way to the inner end of the extruding orifice 18 in the nipple member 4 through which the conductor 27 travels during the extruding processes.

Figure 4:
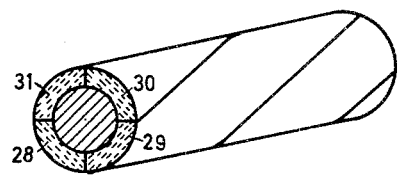
Fig. 4 is a cross-sectional and perspective view of a portion of an insulated electrical conductor with a helical two-color insulation produced by the apparatus according to the invention.

The conductor 27 is pulled through the nozzle in the direction of the arrow M and, during passage therethrough, becomes coated with a subdivided helical covering which, as illustrated in Fig. 4, comprises the helical portions 28, 29, 30 and 31.

It will be obvious to those skilled in the art upon a study of this disclosure that my invention permits of various and diversified modifications without departing from the essential features of the invention and within the scope of the claims annexed hereto.

I claim:

1. Apparatus for the extrusion molding of helically sub-divided strand-shaped structures of plastic material, comprising a stationary extrusion head member having a conical central opening, an extrusion nozzle rotatably disposed within said opening of said extrusion head member, said extrusion nozzle being co-axial with said head-member opening and having a conical surface complementary to, and sealingly engageable with said conical opening of said head member, drive means for rotating said nozzle, said nozzle being axially and radially displaceable relative to said head member, spring means for urging said extrusion nozzle against said conical opening of said head member so that a sealing is effected between said head member and said extrusion nozzle during rotation of said nozzle, said extrusion nozzle having an axial extrusion orifice, and a plurality of separate channel means interconnecting said head member and said nozzle orifice for supplying plastic material to be extruded.

2. Apparatus for the extrusion molding of a helically sub-divided insulating covering of plastic material around wires and the like core material, comprising guide means defining a linear travel path for the core material, a stationary extrusion head member coaxially surrounding said path and having a centrally located opening of conical shape widening in the travel direction of the core material, an extrusion nozzle concentrically surrounding said path and having a conical sealing face mating said opening and engageable therewith, drive means for rotating said nozzle, said nozzle being axially and radially displaceable relative to said head member, spring means for urging said extrusion nozzle against said conical opening of said head member so that a sealing is effected between said head member and said extrusion nozzle during rotation of said nozzle, said extrusion nozzle having an axial extrusion orifice, and a plurality of separate channel means interconnecting said head member and said nozzle orifice for supplying plastic material to be extruded.

3. Apparatus for the extrusion molding around wires, cables, cords and the like of an insulating covering of plastic material subdivided helically into portions of different colors, comprising a stationary extrusion head member having a conical central opening, an extrusion nozzle rotatably disposed within said opening of said extrusion head member, said extrusion nozzle comprising a substantially conical shell member having an outer conical surface and an inner conical surface, said outer surface being complementary with and located within said conical opening of said head member, an insert member having a first outer conical surface complementary and in engagement with said inner conical surface of said shell member, said insert member having a second outer conical surface axially spaced from and oppositely inclined to said first conical surface, a nipple piece fitted within said shell member and having a central orifice and an inner conical surface complementary and in engagement with said second outer conical surface of said insert member, a plurality of supply channels in said extrusion head member for supplying plastic material to said extrusion nozzle, means to force the plastic material through said supply channels, a plurality of arcuate openings in said shell member communicating with said supply channels, said insert member being longitudinally grooved in its second outer conical surface to provide a plurality of nozzle channels for passing the material from said supply channels to said orifice, drive means for rotating said extrusion nozzle, and spring means floatingly urging said extrusion nozzle against said conical opening of said head member so that a sealing is effected between said conical opening and said extrusion nozzle during rotation of said extrusion nozzle.

4. Apparatus for the extrusion molding around wires, cables, cords and the like of an insulating covering of plastic material subdivided helically into portions of different colors, comprising a stationary extrusion head member having a conical central opening, an extrusion nozzle rotatably disposed within said opening of said extrusion head member, said extrusion nozzle comprising a substantially conical shell member having an outer conical surface and an inner conical surface, said outer surface being complementary with and disposed within the conical opening of said head member, an insert member having a first outer conical surface complementary and engageable with said inner conical surface of said shell member, said insert member having a second outer conical surface axially spaced from and oppositely inclined to said first conical surface, a nipple piece having a central orifice fitted within said shell member and having an inner conical surface complementary with and in engagement with respect to said second outer conical surface of said insert member, a plurality of supply channels in said extrusion head member for supplying plastic material to said extrusion nozzle, a plurality of arcuate openings in said shell member communicating with said supply channels, said insert member being longitudinally grooved in its second outer conical surface to provide a plurality of nozzle channels for the movement of material from said supply channels to said orifice, each of said supply channels communicating with two or more of said plurality of nozzle channels, drive means for rotating said extrusion nozzle, and spring means between said drive means and said nozzle for floatingly urging said nozzle against the conical opening of said head member so that a sealing is effected between said conical opening and said extrusion nozzle during rotation of said extrusion nozzle.

5. Apparatus for the extrusion molding around wires, cables, cords and the like of an insulating covering of plastic material subdivided helically into portions of different colors, comprising a stationary extrusion head member having a conical central opening, an extrusion nozzle rotatably disposed within said opening of said extrusion head member, said extrusion nozzle comprising a substantially conical shell member having an outer conical surface and an inner conical surface, said outer surface being complementary with and located within said conical opening of said head member, an insert member having a first outer conical surface complementary to and in engagement with said inner conical surface of said shell member, said insert member having a second outer conical surface axially spaced from and oppositely inclined to said first conical surface, a nipple piece fitted within said shell member and having a central orifice and an inner conical surface complementary with and in fixed engagement with respect to said second outer conical surface of said insert member, a plurality of supply channels in said extrusion head member for supplying plastic material to said extrusion nozzle, each of said supply channels comprising an annular groove in the surface formed by said conical opening in said head member, a plurality of arcuate openings in said shell member communicating with said supply channels, said insert member being longitudinally grooved in its second outer conical surface to provide a plurality of nozzle channels for the passage of material from said supply channels to said orifice, drive means for rotating said extrusion nozzle, and spring means urging said extrusion nozzle against the conical opening of said head member so that a sealing is effected between said conical opening and said extrusion nozzle during rotation of said extrusion nozzle.

6. Apparatus for the extrusion molding around wires, cables, cords and the like of an insulating covering of plastic material subdivided helically into portions of different colors, comprising a stationary extrusion head member having a conical central opening, an extrusion nozzle rotatably disposed within said opening of said extrusion head member, said extrusion nozzle comprising a substantially conical shell member having an outer conical surface and an inner conical surface, said outer surface being complementary with and located within the conical opening of said head member, an insert member having a first outer conical surface complementary to and in engagement with said inner conical surface of said shell member, said insert member having a second outer conical surface axially spaced from and oppositely inclined to said first conical surface, a nipple piece fitted within said shell member and having a central orifice and an inner conical surface complementary with and in fixed engagement with respect to said second outer conical surface of said insert member, a plurality of supply channels in said extrusion head member for supplying material to said extrusion nozzle, said channels defining dividing ribs for the material being extruded, said ribs being in close-fitting sealing engagement with said nipple piece and terminating at said orifice, drive means for rotating said extrusion nozzle, and spring means cooperative with said drive means for floatingly urging said extrusion nozzle against the conical opening of said head member so that a sealing is effected between said conical opening and said extrusion nozzle during rotation of said extrusion nozzle.

7. Apparatus for the extrusion molding around wires, cables, cords and the like of an insulating covering of plastic material subdivided helically into portions of different colors, comprising a stationary extrusion head member having a conical central opening, an extrusion nozzle rotatably disposed within said opening of said extrusion head member, said extrusion nozzle having a conical surface complementary to and fitted within said conical opening of said head member, drive means for rotating said extrusion nozzle, spring means cooperative with said drive means for floatingly urging said extrusion nozzle against the conical opening of said head member so that a sealing is effected between said conical opening and said extrusion nozzle during rotation of said extrusion nozzle, said extrusion nozzle having an axial extrusion orifice adapted for the drawing therethrough of the member to be covered with the plastic material, and a plurality of separate conduit means between said head member and said nozzle orifice for supplying the material being extruded.

8. Apparatus for the extrusion molding around wires, cables, cords and the like of an insulating covering of plastic material subdivided helically into portions of different colors, comprising a stationary extrusion head member having a conical central opening, an extrusion nozzle rotatably disposed within said opening of said extrusion head member, said extrusion nozzle having a conical surface complementary to and fitted within said conical opening of said head member, drive means for rotating said extrusion nozzle, spring means cooperative with said drive means for floatingly urging said extrusion nozzle against the conical opening of said head member so that a sealing is effected between said conical opening and said extrusion nozzle during rotation of said extrusion nozzle, said extrusion nozzle having an axial extrusion orifice adapted for the drawing therethrough of the member to be covered with insulating material, a pair of conduit means in said head member for supplying the materials to be extruded, means for forcing the materials along said conduit means, and two pairs of channels in said nozzle member, one pair each communicating with one of said conduit means and extending to said nozzle orifice.

References Cited in the file of this patent
UNITED STATES PATENTS

| | | |
|---|---|---|
| 2,644,983 | Curtiss | July 14, 1953 |
| 2,674,007 | Allemann et al. | Apr. 6, 1954 |